United States Patent [19]

McCullough

[11] Patent Number: 4,942,665

[45] Date of Patent: Jul. 24, 1990

[54] MEAT TRIMMING KNIFE AND DRIVE SYSTEM THEREFORE

[76] Inventor: Timothy J. McCullough, 833 Aurora Rd., Vermillon, Ohio 44089

[21] Appl. No.: 409,571

[22] Filed: Sep. 19, 1989

[51] Int. Cl.$^5$ ............................................ A22C 17/04
[52] U.S. Cl. ........................................ 30/276; 17/16; 30/347
[58] Field of Search ................ 30/276, 347, 389, 264, 30/301, 296.1; 17/1 G; 51/73 R; 125/14

[56] References Cited

U.S. PATENT DOCUMENTS

| | | | |
|---|---|---|---|
| 1,545,835 | 7/1925 | Komous et al. | 30/276 |
| 2,827,657 | 3/1958 | Bettcher | 17/1 |
| 3,269,010 | 8/1966 | Bettcher | 30/276 |
| 3,852,882 | 12/1974 | Bettcher | 30/276 |
| 4,144,867 | 3/1979 | Wachs et al. | 125/14 |
| 4,178,683 | 12/1979 | Bettcher | 30/276 |
| 4,646,607 | 3/1987 | Johansson | 30/389 X |
| 4,702,006 | 10/1987 | McCullough | 30/276 |

Primary Examiner—Douglas D. Watts
Attorney, Agent, or Firm—Michael Sand Co.

[57] ABSTRACT

A meat trimming knife for removing meat from carcasses and an ON/OFF control switch therefor wherein the knife is suspended above a work table by a power supply line which is connected to the knife through an elongated handle that extends generally vertically from the knife and generally parallel to the rotational axis of a ring-shaped cutting blade. In a first embodiment, an electric drive motor is suspended above the work station and the knife blade is rotated by a flexible drive cable connected to the motor by a drive belt and pulleys located within a horizontal housing. Downward vertical movement of the knife will pivot the housing through the connected drive cable to actuate a control switch to operatively connect the drive motor to the cable for rotating the blade. Upon release of the downward pull on the knife a spring or counterweight will pivot the belt housing upwardly to automatically actuate the switch to deenergize the drive motor. The drive cable enters the knife through a hollow bore of the elongated knife handle. In a second embodiment, an air motor is mounted in the knife's handle and is connected to a remote source of pressurized air through an air supply conduit which enters the knife through the rear of the handle. Upward and downward movement of the knife which is suspended above the work table by the air supply conduit, by an operator, will selectively stop and start the flow of air through the power supply line by actuating a power control switch.

22 Claims, 4 Drawing Sheets

U.S. Patent   Jul. 24, 1990   Sheet 1 of 4   4,942,665
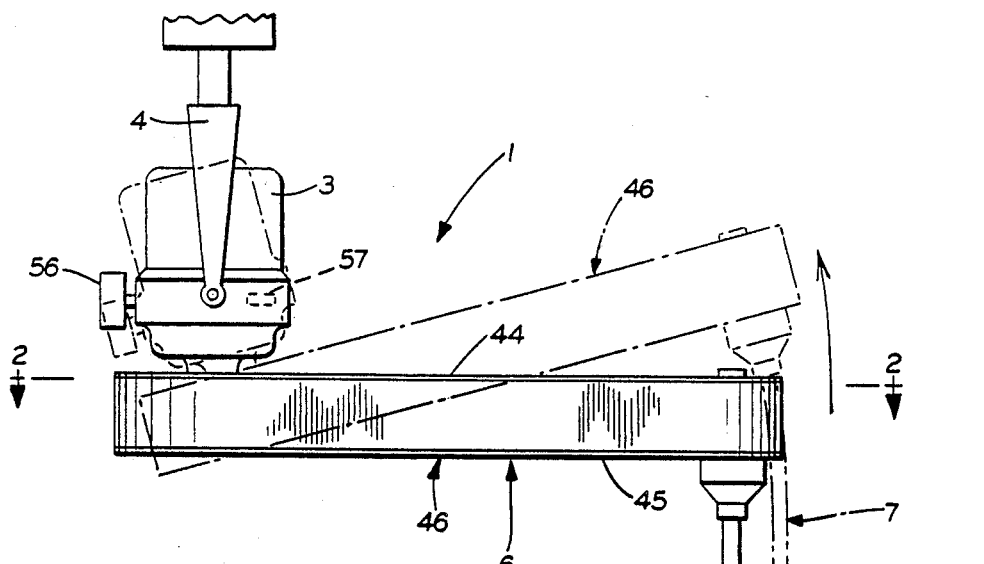
FIG.1
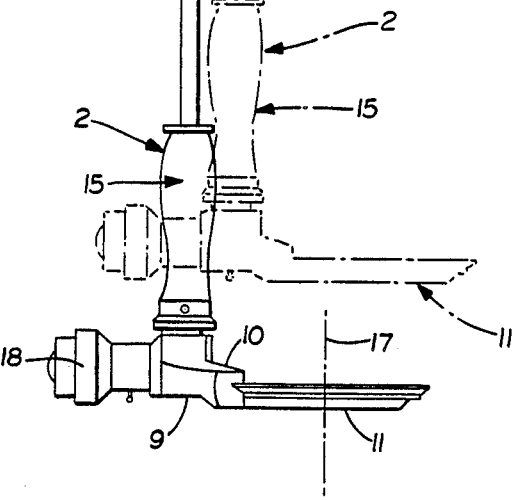
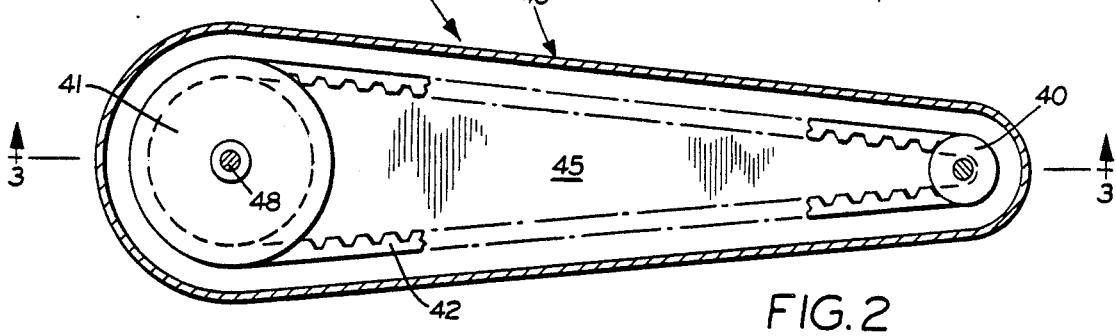
FIG.2
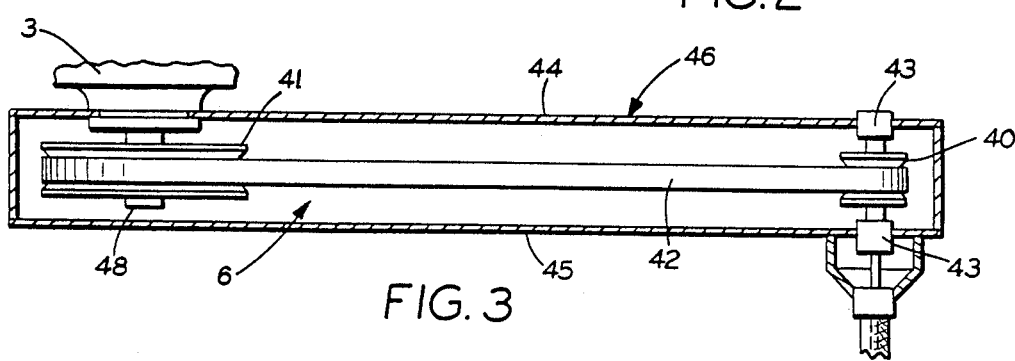
FIG.3

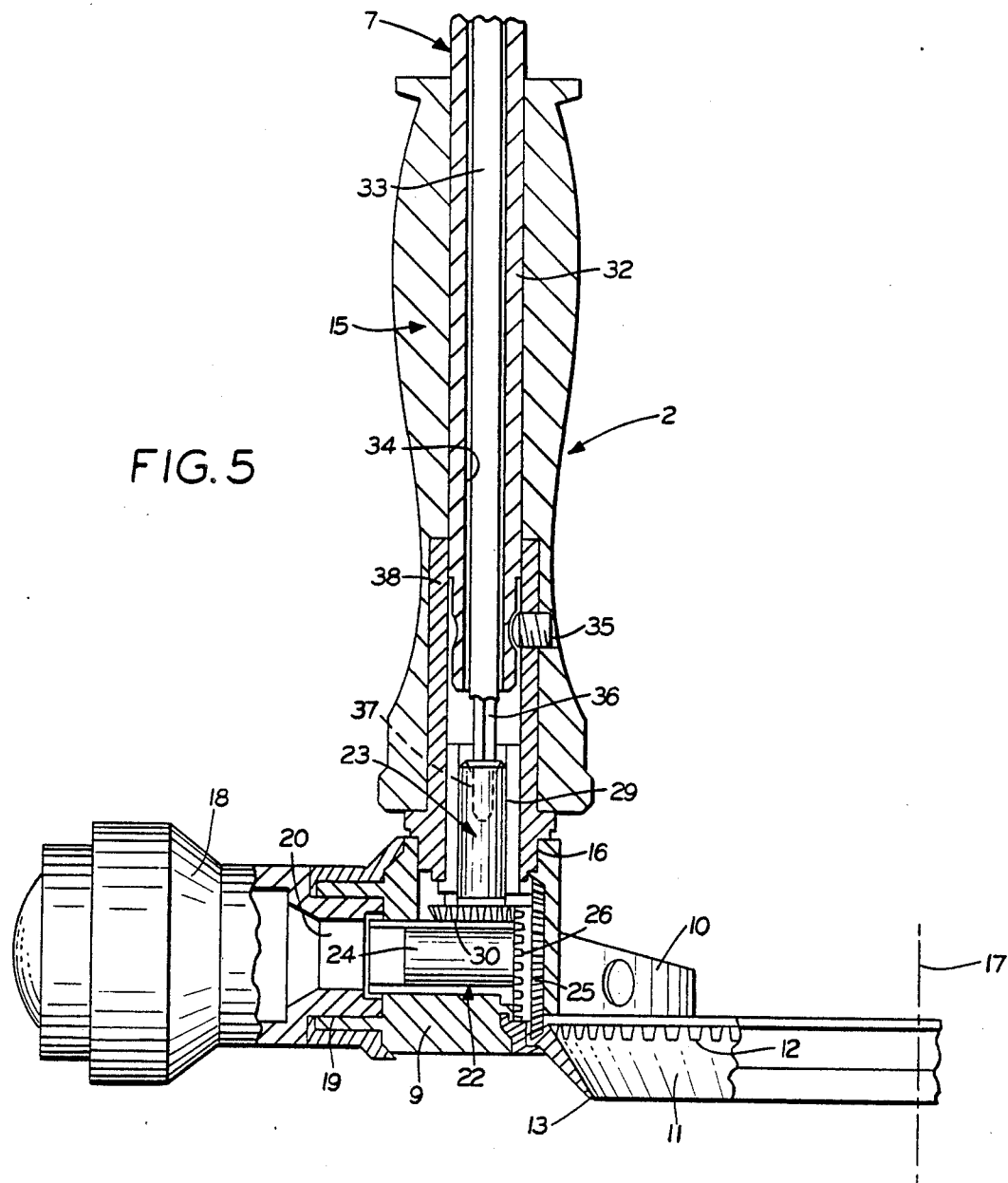
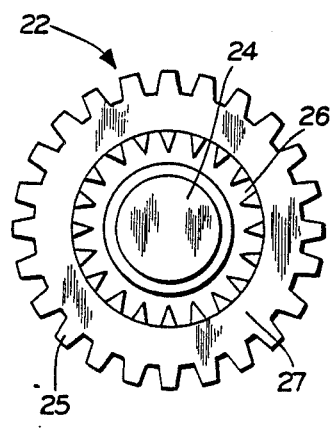
FIG.7
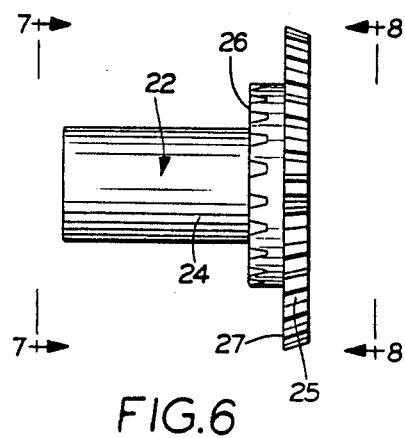
FIG.6
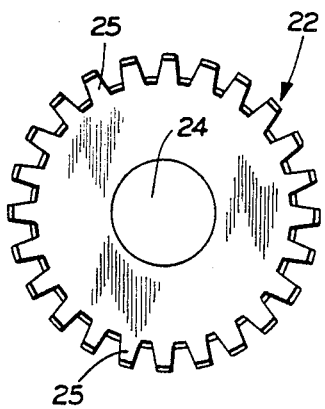
FIG.8

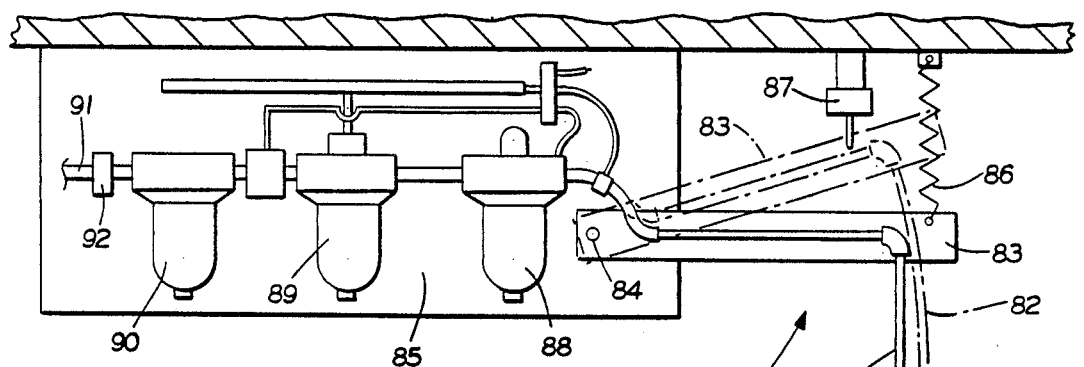
FIG. 11
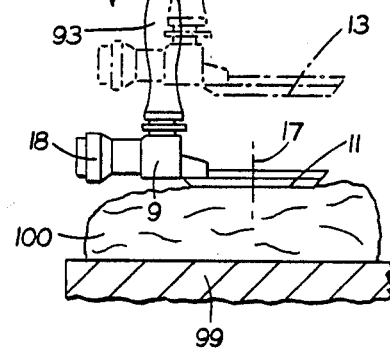
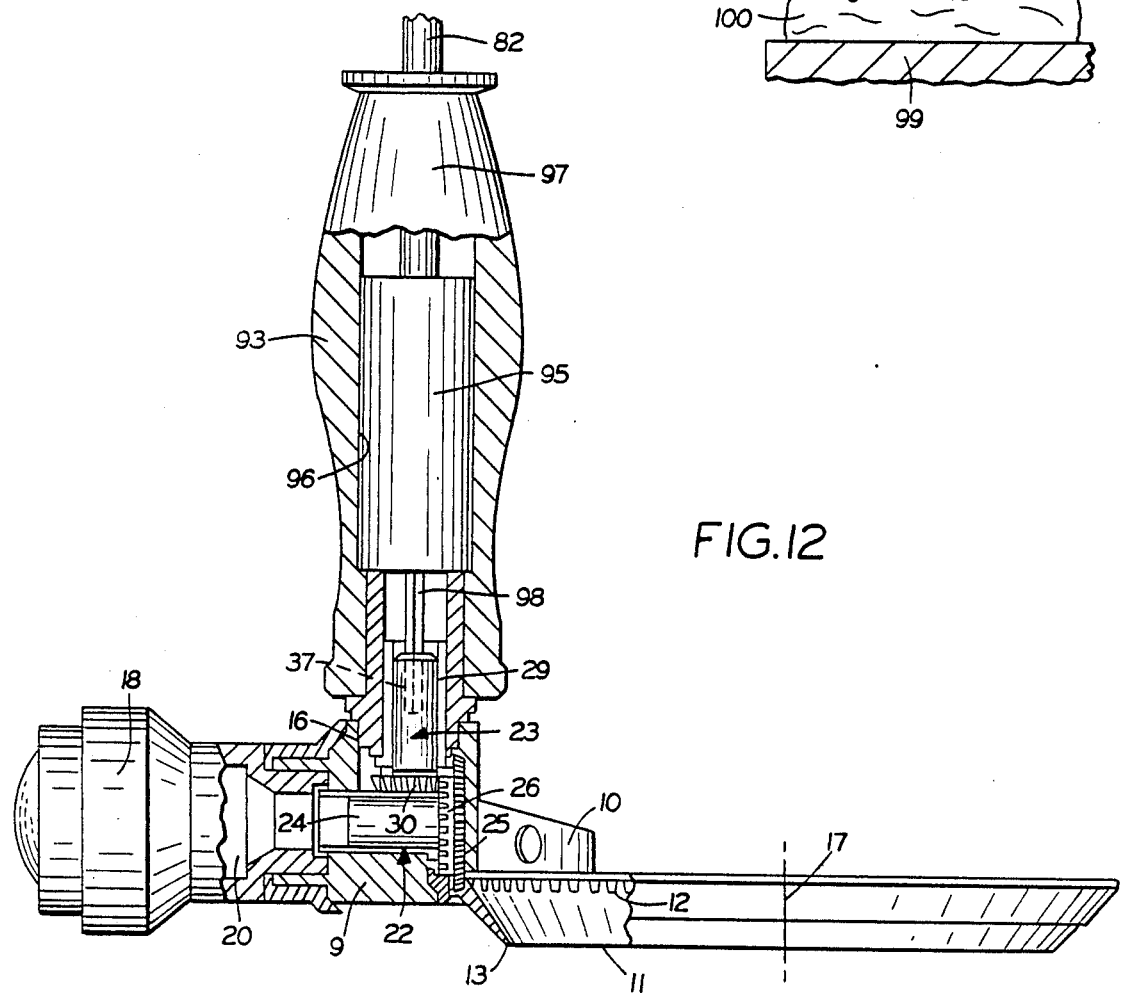
FIG. 12

MEAT TRIMMING KNIFE AND DRIVE SYSTEM THEREFORE

BACKGROUND OF THE INVENTION

1. Technical Field

The invention relates to meat cutting devices and particularly to a power driven meat cutting knife adapted to be manually held and manipulated for the quick and easy removal of meat from carcasses and bones. More particularly, the invention relates to an improved knife and the drive system therefore in which the handle of the knife extends vertically therefrom and parallel with the rotational axis of a ring-shaped cutting blade; in which the knife is suspended vertically above a work table and is easily moved by the operator into trimming position; and in which vertical movement of the knife with respect to the work table automatically controls the actuation and deactuation of the power supply to the trimming blade.

2. Background Information

Various styles of power driven meat cutting tools have been devised and various drive system therefor, wherein a ring blade is rotatably mounted on a blade holder which is mounted on a manually operated, power driven handpiece. These tools have been used for some time to facilitate the removal of meat from a carcass, primarily in the trimming operation or for removing the meat remains from the bones. These meat cutting tools are either electrically or pneumatically driven. Some examples of the electric prior meat cutting tools are shown in U.S. Pat. Nos. 3,269,010, 3,461,557, 3,852,882, 4,324,043 and 4,575,938. Examples of pneumatic driven tools are shown in U.S. Pat. Nos. 3,852,882 and 4,575,938. Drive systems for these electric and pneumatic driven tools also are shown in these patents.

These power driven tools or trimming knives, as they are generally referred to in the industry, consist of a tubular handle which is connected to an arcuate shaped blade attachment front portion. The handle is formed with a hollow bore extending throughout the longitudinal length of the handle. The blade is rotatably mounted on an annular blade holder which is mounted on the front end of the blade attachment portion. The power supply for rotating the blade is usually a flexible drive cable which is connected to a remotely mounted electric motor or a fluid supply line which is connected to a remote source of pressurized air which is connected to an air motor mounted within the handle. Both the flexible drive cable or the output shaft of the air motor are connected to a pinion gear or the like rotatably mounted within the handle or blade holder attachment member. This gear is provided with a series of teeth for rotatably engaging teeth on one end of the cutting blade for rotating the blade in a circular motion.

However, in all of these prior art knives, the handle extends outwardly in the same general direction as the plane of the cutting blade, or perpendicular to the rotational axis of the circular cutting blade, which axis extends perpendicular to the plane of the blade and passes through the center thereof. This arrangement and the drive system therefor requires the operator to completely support the weight of the knife while it is being utilized in a trimming operation. It also requires constant twisting and flexing of the connected drive cable or pneumatic supply line during the cutting procedure. Although the trimming knife and connected power supply line is relatively lightweight, it does over a period of time, such as throughout a operators workshift, cause operator hand and arm fatigue reducing production output and possible discomfort to the operator. Operators have found that for certain trimming operations such as when the blade moves horizontally across the workpiece, it is desirable to have the handle extending vertically from the workpiece. However, this requires the makeshift attachment of a separate handle to the handpiece while still requiring the power supply line to extend outwardly from the handpiece perpendicular to the rotational axis of the cutting blade. It also increases the weight of the trimming knife adding to the further discomfort and fatigue of the operator.

It is desirable in the drive system for such trimming knives to provide ON/OFF switches whereby the operator can deenergize the machine during short stoppages in the trimming procedures to enable him to set the knife down and flex his hand to relive the fatigue and stress thereon. However, nearly all known prior art control systems require the operator to physically put the knife on the work table after deenergizing the same by a switch on the knife or a switch located above at the electric drive motor location. This procedure requires additional time and motion which may not be practical during trimming procedures wherein the meat is brought to the operator on a moving table or conveyor, and the operator does not have sufficient time during the passage of each carcass to relax his or her grip on the knife.

Therefore, a need exists for a trimming knife in which the handle extends vertically from the knife and in which the power supply line enters the knife through the handle as in prior trimming knives, without affecting the remaining components of the knife; and in particular for a knife in which part of the knife's weight can be supported externally of the operator to reduce operator fatigue; and in which an improved safety control ON/OFF switching mechanism is provided to enable the operator to occasionally relax his or her grip on the trimming knife without the machine remaining energized.

SUMMARY OF THE INVENTION

Objectives of the invention include providing an improved meat trimming knife and drive system therefore in which the handle of the knife extends vertically therefrom and parallel with the rotational axis of the ring-shaped cutting blade in contrast to prior art trimming knives wherein the handle extended generally horizontally or perpendicular to the rotational axis of the cutting blade; and in which the power supply line whether it be an electric motor driven flexible drive cable or a pressurized pneumatic line, enters the rear of the handle and extends therethrough for connecting with the drive gear for drivingly rotating the cutting blade.

Another objective of the invention is to provide such an improved knife and drive system in which the power supply line suspends the knife over a work table requiring the operator to pull downwardly on the knife to facilitate the horizontal trimming of the meat, and which reduces the effective weight of the knife heretofore required to be supported by the operator thereby reducing fatigue and improving overall trimming efficiency.

A still further objective of the invention is to provide such a meat trimming knife and drive system in which the suspended knife is provided with an automatic ON/OFF switch whereupon downward movement of the suspended knife will automatically actuate the drive source for the cutting blade, and whereupon upward movement of the knife will automatically deenergize the drive force for the cutting blade; and in which the suspension of the knife can be spring biased or counterweighted to bias the knife to the raised OFF position to reduce the weight of the handpiece and to increase operator safety.

A still further objective of the invention is to provide such an improved meat trimming knife and drive system in which three sets of gear teeth are provided within the handle and/or blade attachment member of the knife for transmitting the drive torque to the cutting blade, and which enables various gear ratios to be selected to achieve various blade and cable speeds depending upon the type of remote power supply drive system.

A still further objective is to provide such a meat trimming knife and drive system which will increase operator trimming efficiency by reducing operator fatigue, which will provide a safe trimming knife and drive system, which will enable many of the heretofore used components of the various trimming knives to be utilized; and in which the knife can be readily cleaned and maintained in a satisfactory condition as in prior trimming knives without appreciably increasing the cost thereof.

These objectives and advantages are obtained by the improved meat trimming knife of the invention, the general nature of which may be stated as including a blade holder attachment member; a blade holder mounted on the attachment member; a ring-shaped cutting blade rotatably mounted on the blade holder and having a circumferential cutting edge rotatable about a central rotational axis of the blade; an elongated handle mounted on the attachment member having a longitudinal axis extending generally parallel to and spaced from the rotational axis of the blade; and driving means in the handle drivingly connected to the cutting blade for rotatably driving said blade.

These objectives and advantages are further obtained by the improved meat trimming knife and drive system of the invention, the general nature of which may be stated as including a power source located generally remote from and above a work station; a manually operated trimming knife suspended above the work station by a power supply line, said knife having a ring-shaped cutting blade rotatably mounted on a blade holder of the knife and driven about a central rotational axis of the blade by the power source; a vertically extending handle on the trimming knife adapted to be grasped by a user of the knife for moving the blade across a piece of meat being trimmed, with a longitudinal axis of the handle extending generally parallel to the rotational axis of the cutting blade; and driving means extending through the handle and connected to the power source by the power supply line for rotatably driving the cutting blade.

BRIEF DESCRIPTION OF THE DRAWINGS

Preferred embodiments of the invention, illustrative of the best modes in which applicant has contemplated applying the principles, are set forth in the following description and are shown in the drawings and are particularly and distinctly pointed out and set forth in the appended claims.

FIG. 1 is a diagrammatic elevational view showing a first embodiment of the vertically driven meat trimming knife, in which the knife is an electric knife and is shown suspended beneath an electric drive motor in full line operating position, and in dot-dash lines in a raised inoperative position;

FIG. 2 is an enlarged fragmentary sectional view taken on line 2—2, FIG. 1;

FIG. 3 is a fragmentary sectional view taken on line 3—3, FIG. 2;

FIG. 5 is an enlarged fragmentary view with portions broken away and in section, of the vertically driven electric meat trimming knife of FIG. 1;

FIG. 6 is an elevational view of one of the drive gears removed from the trimming knife of FIG. 5;

FIG. 7 is an end elevational view looking in the direction of arrow 7—7, FIG. 6;

FIG. 8 is an end elevational view looking in the direction of arrows 8—8, FIG. 6;

FIG. 11 is a diagrammatic elevational view showing a second embodiment of the vertically driven meat trimming knife in which the knife is a pneumatic driven knife and is shown suspended beneath the pressurized air supply system in full line operating position, and is shown in dot-dash lines in a raised inoperative position; and FIG. 12 is an enlarged fragmentary view with portion broken away and in section, of the vertically driven pneumatic meat trimming knife of FIG. 11.

Similar numerals refer to similar parts throughout the drawings.

DESCRIPTION OF THE PREFERRED EMBODIMENTS

Figure 4:
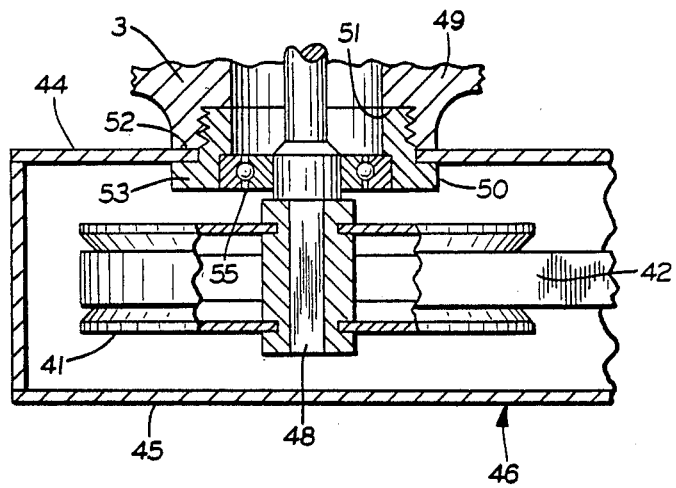
FIG. 4 is an enlarged fragmentary view with portions broken away and in section, of the left hand end portion of FIG. 3.

A first embodiment of the improved meat trimming knife and connecting drive system is indicated generally at 1, and is shown in FIG. 1. The improved knife is indicated generally at 2, and is shown in full lines in its usual operating position and in dot-dash lines in a raised inoperative position. System 1 includes an electric motor 3 which is supported by a hanger 4 closely adjacent to and above a work table or station on which a meat trimming operation is being performed. A drive belt power transmission arrangement indicated generally at 6, extends between the bottom of motor 3 and a flexible drive shaft indicated generally at 7, which drivingly connects motor 3 to knife 2.

Knife 2 is best shown in FIG. 5 and includes a usual blade holder attachment member 9, and a generally ring-shaped blade holder 10 mounted on the front end of member 9 by a plurality of screws or other mounting arrangements, such as shown in U.S. Pat. Nos. 3,269,010, 3,461,557, 3,852,882, 4,324,043 and 4,575,938. An annular ring-shaped cutting blade 11 is rotatably mounted on blade holder 10 and is provided with a plurality of gear teeth 12 which are formed about an upper edge of the blade, with a cutting edge 13 extending circumferentially about the lower edge of blade 11. The particular configuration of blade holder attachment member 9, blade holder 10 and blade 11 may vary without affecting the concept of the invention and are components well known in the meat trimming knife art.

In accordance with one of the features of the invention, an elongated hollow handle indicated generally at 15, is mounted within a threaded opening 16 formed in an upper portion of blade attachment member 9, and extends generally parallel to the rotational axis 17 about which blade 11 is rotatably driven. A usual grease cup 18 is threadably connected at 19 within a grease inlet opening 20 formed in a rear portion of blade holder attachment member 9. Examples of such grease cups are shown and described in several of the above identified prior art meat trimming knife patents, and provides a readily available supply of grease to lubricate the power transmitting gears 22 and 23 mounted within attachment member 9.

Gear 22 is shown particularly in FIGS. 5-8 and includes a cylindrical hub 24 and a first set of circumferential gear teeth 25 and a second set of gear teeth 26. Gear teeth 25 are concentric with gear teeth 26 and are axially spaced therefrom with teeth 26 being formed on the flat back surface 27 of gear teeth 25. Gear 23 includes a cylindrical hub 29 and a set of gear teeth 30 (FIG. 5) which meshingly drivingly engages gear teeth 26 of gear 22 which, in turn, rotates gear teeth 25 which are drivingly engaged with gear teeth 12 of blade 11.

Flexible drive shaft 7 is of a usual construction having an outer casing 32 and an interior flexible metal cable 33 rotatably mounted therein. Drive shaft 7 extends into and generally through bore 34 of handle 15 and is retained in position by a set screw 35. Cable 33 terminates in a squared end 36 which is drivingly engaged within a complementary shaped opening 37 formed in the end of cylindrical hub 29. A coupler sleeve 38 may be used to threadably connect handle 15 to attachment member 9.

Thus, in accordance with one of the features of the invention, the flexible drive shaft enters the knife in a vertical manner and is generally parallel with the rotational axis 17 of knife blade 11. In many trimming operations, the knife is moved in a generally horizontal direction across a meat carcass supported on a horizontal table wherein the severed meat passes upwardly through the central opening of ring-shaped blade 11. The vertical mounting of handle 15 greatly facilitates this horizontal movement. Heretofore, in nearly all known power operated meat trimming knives, the drive source, whether it be the flexible drive shaft of an electric operated motor or the pressurized fluid supply line of a pneumatic driven knife, extends through the handle which extends outwardly from the blade attachment member in a generally horizontal direction or perpendicularly to the rotational axis of the meat trimming blade or 90 degrees from that of the mounting location of improved knife 2 as shown particularly in FIGS. 1 and 5.

The double series of gear teeth on gear 22 (FIG. 6) in combination with the single set of gear teeth on gear 23 (FIG. 5), enables a variety of ratios to be achieved between meshing gears 22 and 23 and gear teeth 23 of blade 11, to provide a variety of ratio selections for various blade speeds and cable speeds depending upon the particular drive source connected thereto.

Referring particularly to FIGS. 1-4, flexible drive shaft 7 is drivingly connected to motor 3 through power transmission arrangement 6 by a pair of drive pulleys 40 and 41 and an endless timing belt 42 extending therebetween. Pulleys 40 and 41 and belt 42 are preferably cogged to provide the accurate timing relationship therebetween. Pulley 40 is rotatably mounted by a pair of bearings 43 which may be press-fitted into top and bottom walls 44 and 45 of a generally oval-shaped belt housing, indicated generally at 46. Pulley 41 is mounted on the output shaft 48 of motor 3 with belt 42 extending in the generally horizontal radially outward direction with respect to shaft 48 when in its usual operating position as shown in full lines in FIG. 1.

Referring to FIG. 4, belt housing 46 is rotatably mounted on the bottom end of housing 49 of motor 3 by use of a clamping nut 50 which is tightened against a shoulder 51 of motor housing 49 to provide a predetermined sized annular groove 52 between motor housing 49 and a step shoulder 53 on nut 50. A bearing 55 will be mounted in clamping nut 50 to provide a rotational support for motor shaft 48. Clamp nut 50 is sized so that when tightened against shoulder 51 of motor housing 49 it will provide the desired spacing for groove 52 to provide for the free rotational movement of belt housing 46 thereon.

The operation of the improved drive system is shown particularly in FIG. 1. A counterweight 56 is mounted on motor 3 and is sized so as to pivot belt housing 46 to an upward position as shown in dot-dash lines, at which position a motion or position detection switch 57 will be actuated to deenergize motor 3. The operator when desiring to perform a trimming operation merely grasps handle 15 and pulls downwardly on knife 2 to the desired generally horizontal working position as shown in full lines, which movement will be detected by switch 57 to actuate motor 3 which will then rotate blade 11 through power transmission arrangement 6 and flexible drive shaft 7 and meshing gears 22 and 23.

Upon completing a trimming operation, the operator merely releases his grip on handpiece 15 and may push slightly upwardly thereon in certain installations, whereupon counterweight 56 will pivot housing 46 and knife 2 upwardly, which movement will be sensed by switch 57 which will immediately deenergize motor 3 stopping the rotation of blade 11. If desired, counterweight 56 can be sufficient to automatically raise the knife and power transmission assembly to the OFF position without requiring any upward force from being exerted on the knife and flexible drive shaft by the operator. Also, an ON/OFF device could be provided on the handle of knife 2 such as shown in U.S. Pat. No. 4,794,273.

Figure 9:
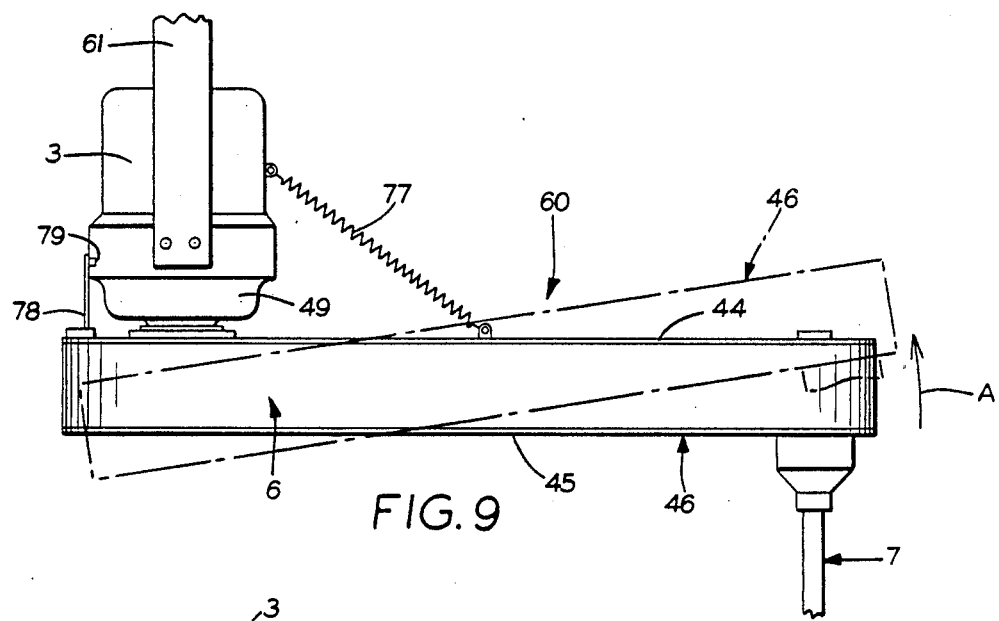
FIG. 9 is a fragmentary diagrammatic elevational view similar to FIG. 1, showing a modified mounting arrangement of the improved vertically driven electric trimming knife of the invention.
Figure 10:
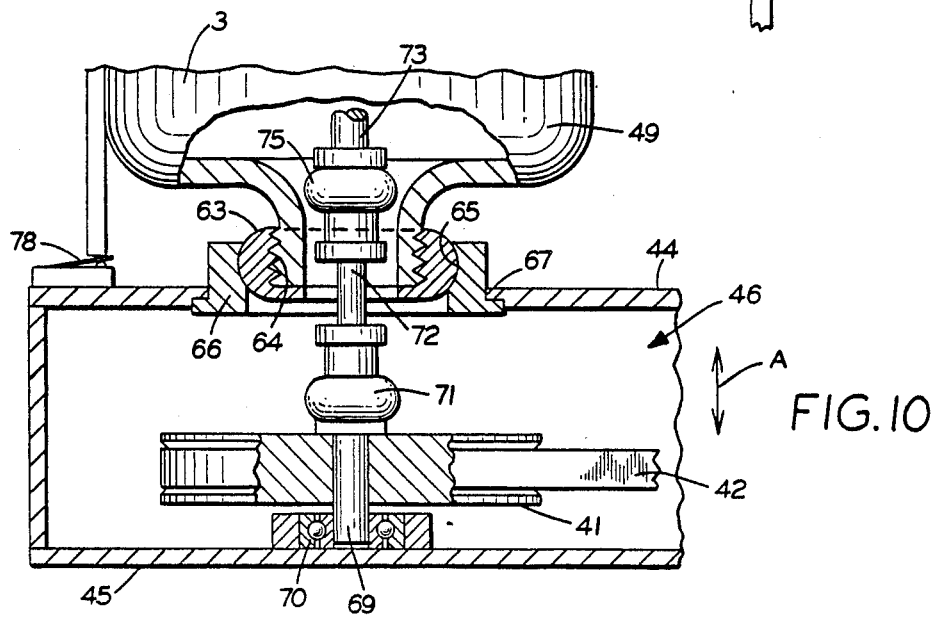
FIG. 10 is an enlarged fragmentary view with portions broken away and in section, showing the pivotal mounting arrangement of the drive belt housing with the electric drive motor for the modified mounting arrangement of FIG. 9.

A second embodiment of the improved drive system is indicated generally at 60, and is shown in FIGS. 9 and 10. Embodiment 60 is similar in most respects to embodiment 1 described above except that belt housing 46 is pivotally and rotationally mounted with respect to motor 3 which is mounted in a generally rigid position by a mounting bracket 61 instead of being pivotally mounted on bracket 4 as described above. This pivotal and rotational mounting arrangement of housing 46 is best shown in FIG. 10. A nylon spherical member 63 is threadably mounted on a threaded lower end 64 of motor housing 49 and is captured within a complementary shaped socket 65 formed in an annular mounting member 66 which is press-fitted within an opening 67 formed in housing top wall 44. Thus, belt housing 46 is suspended from the bottom of motor 3 by the ball and socket like mounting arrangement, and in addition is rotatable in a general horizontal direction and is pivotal as shown by arrow "A" in FIG. 9.

Referring to FIG. 10, pulley 41 is mounted on a stub shaft 69 which is supported in a lower bearing 70 and is connected to a flexible coupler 71. Coupler 71 is connected to another stub shaft 72 which is connected to main motor shaft 73 by a second flexible coupling 75. Couplings 71 and 75 are well known in the art and permit some axially sliding movement of connecting shaft 72 therebetween, and in addition enables pulley 10 shaft 69 to tilt in the direction of arrow "A" and still provide efficient transmission of power between fixed motor shaft 73 and shafts 72 and 69 as motor housing 46 pivots and moves about the lower end of motor 3.

FIG. 9 discloses the use of a spring 77 to move belt transmission arrangement 6, drive shaft 7 and the attached knife from its lower generally horizontal operating position as shown in full lines, to its raised inoperative OFF position shown diagrammatically by dot-dash lines. A limit switch 78 is shown replacing the position or motion detection switch 57 of FIG. 1, and is actuated by a plunger 79 mounted on the motor upon drive arrangement 6 and knife 2 reaching the horizontal operating or ON position. Thus, upward movement of belt housing 46 will engage limit switch 78 with plunger 79 which will immediately deenergize drive motor 3 preventing further rotation of cutting blade 11 as described above.

Another embodiment of the improved trimming knife and drive system therefor is indicated generally at 80, and is shown diagrammatically in FIGS. 11 and 12. A power supply line or fluid conduit 82 is suspended from a support arm 83 or other type of mechanism, which is pivotally mounted at 84 to a bracket 85 and is biased in an upward or raised position by a spring 86. Upward movement of arm 83 actuates a control switch 87, which could be a limit type mechanical engaged switch, a mercury sensing switch, or other type of electronic sensing devices to detect when support arm 83 is in the raised or OFF position. Fluid conduit 82 which usually will be a pressurized air supply line, is connected to an air line lubricator 88 which is connected to a pressure regulator 89 and a filter 90. All of these components are well known in the pneumatic air knife art. A pressurized incoming air line 91 enters filter 90 and exit line lubricator 88 and is connected to a compressor or main air line of a pneumatic system which extends throughout many industrial plants and in particular in meat processing plants where improved pneumatic trimming knife 93 will be used. Switch 87 will be connected to a pneumatic shut off valve 92 for starting or stopping the flow of pressurized air through conduit 82 to knife 93.

Referring to FIG. 12, knife 93 is similar in many respects to knife 2 described above except that a usual pneumatic or fluid air motor 95 is mounted within a hollow interior 96 of handle 97 and has a squared output shaft 98 which is engaged with squared opening 37 of drive gear 23 in a similar manner as its squared end 36 of flexible drive cable 33 of FIG. 5. The remaining gearing of knife 93 is similar to that of knife 2 and therefor is not described in detail.

The operation of this third embodiment which utilizes pneumatic trimming knife 93 is similar to that of the first and second embodiments shown particularly in FIGS. 1 and 9. Knife 3 is suspended above a work table 99 on which a carcass or piece of meat 100 is supported. Upon downward movement of knife 93 in the direction of arrow "B", switch 87 will be actuated causing valve 92 to open which will supply pressurized air to motor 95 for rotating blade 11. The operator need only to push partially upwardly or relax his grip on knife handle 97 whereupon spring 86 will raise arm 83 to the OFF position whereupon switch 87 will again actuate valve 92 to block the flow of air to air motor 95. Again, the power supply line or fluid conduit 82 enters handle 97 of improved knife 93 vertically from above, with handle 97 extending in a generally parallel spaced relationship with respect to rotational axis 17 of blade 11 as with electric driven trimming knife 2 discussed above.

The particular mounting arrangement of air knife 93 by the use of arm 83, spring 86 and pivot 84 can vary without affecting the concept of the invention and is shown diagrammatically in FIG. to represent one type of arrangement for achieving the features of the improved drive system. It is easily seen that other types of mounting arrangement could be used for vertically suspending knife 93 above work table 99 so that vertical movement of the knife and connected power supply line will start or stop the flow of pressurized air to air motor 95 contained within handle 97, and in which the incoming supply line enters vertically from above handle for connection with air motor 95.

Accordingly, the improved meat trimming knife and drive system of the invention provides for a trimming knife which is suspended above a work table and which can be moved by a spring, counterweight or the like, so that the knife is automatically raised to an OFF or inoperative position upon release by the operator; and in which the operator support handle extends vertically from the knife so that operator can grasp the handle and move the cutting blade, which is in a generally horizontal plane and perpendicular to the handle, across a piece of meat in a generally horizontal trimming direction which is the preferred cutting angle for many trimming operations. Heretofore, the power supply line for the trimming knife, whether it be a flexible electric motor driven cable or a fluid supply line for an air motor, usually entered the handle of the trimming knife from the rear as in applicant's knife constructions. However, the handle would always extend outwardly perpendicularly with respect to the rotational axis of the ring-shaped cutting blade instead of parallel therewith as in improved trimming knives 2 and 93. Also, the use of the multiple gear teeth enables various gear ratios to be achieved for various meat trimming operations.

It is also readily understood that usual ON/OFF control switches can be incorporated directly into the handle of the electric knife 2 or pneumatic knife 93 in combination with or separately from remote switches 57, 78 and 87 discussed above. The suspension of the knife from above reduces the effective weight of the knife required to be supported by the operator and thereby reduces operator fatigue since operators will use these knives over extended periods of time throughout a usual workshift. Thus, the supported weight of the knife can be appreciably reduced and the operator need only to exert force to move the knife across the piece of meat instead of supporting the entire weight of the knife and connecting supply line as in prior art electric and pneumatic meat trimming knives.

Accordingly the meat trimming knife and drive system therefore is simplified, provides an effective, safe, inexpensive, and efficient device and system which achieves all the enumerated objectives, provides for eliminating difficulties encountered with prior devices and systems, and solves problems and obtains new results in the art.

In the foregoing description, certain terms have been used for brevity, clearness and understanding; but no unnecessary limitation are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved meat trimming knife and drive system is constructed and used, the characteristics of the construction and system, and the advantageous, new and useful results obtained; the new and useful structures, devices, elements, arrangements, parts and combinations, are set forth in the appended claims.

I claim:

1. A hand manipulated meat trimming knife for removal of meat from bones including:
   (a) a blade holder attachment member;
   (b) a blade holder mounted on the attachment member;
   (c) a ring-shaped cutting blade rotatably mounted on the blade holder and having a circumferential cutting edge rotatable about a central rotational axis of the blade;
   (d) an elongated handle mounted on the attachment member having a longitudinal axis extending generally parallel to and spaced from the rotational axis of the blade; and
   (e) driving means in the handle drivingly connected to the cutting blade for rotatably driving said blade.

2. The meat trimming knife defined in claim 1 in which a first gear is mounted in the attachment member and drivingly engages the cutting blade for rotating said blade; in which a second gear is mounted in the attachment member and drivingly engages the first gear for rotating said first gear; and in which the driving means is connected to the second gear for rotating said second gear.

3. The meat trimming knife defined in claim 1 in which the driving means is a flexible drive cable.

4. The meat trimming knife defined in claim 3 in which the flexible cable is operatively connected to an electric motor spaced from said knife.

5. The meat trimming knife defined in claim 4 in which the electric motor has an output shaft which is connected to the flexible cable by a drive belt.

6. The meat trimming knife defined in claim 5 in which the drive belt is located within a belt housing which extends generally radially outwardly with respect to the motor shaft; and in which the belt housing is movably mounted for rotational movement about said motor shaft.

7. The meat trimming knife defined in claim 6 in which the belt housing and motor are pivotally mounted; and in which a sensing switch is operatively connected to the electric motor and detects pivotal movement of said belt housing and motor and controls actuation of said motor depending upon the pivotal position of said motor and belt housing.

8. The meat trimming knife defined in claim 6 in which the belt housing is pivotally mounted with respect to the motor; and in which a sensing switch is operatively connected to the electric motor and detects pivotal movement of the belt housing and controls actuation of said motor depending upon the pivotal position of said belt housing.

9. The meat trimming knife defined in claim 5 in which the drive belt is a cog timing belt.

10. The meat trimming knife defined in claim 6 in which the drive belt extends between a pair of pulleys; in which one of said pulleys is mounted on the motor shaft; and in which the other of said pulleys is operatively connected to the flexible drive cable.

11. The meat trimming knife defined in claim 2 in which the driving means is a flexible drive cable; in which the elongated handle is formed with a central bore; and in which the drive cable extends into the handle bore and is operatively connected to the second gear.

12. The meat trimming knife defined in claim 2 in which the first gear is formed with first and second sets of concentric axially spaced teeth; in which the first set of teeth engages gear teeth formed on the cutting blade for rotating said blade; and in which the second set of teeth is drivingly engaged with a set of teeth on the second gear.

13. A meat trimming knife and drive system therefor for use at a work station for trimming meat from carcasses, including:
   (a) a power source located generally remote from and above the work station;
   (b) a manually operated trimming knife suspended above the work station by a power supply line, said knife having a ring-shaped cutting blade rotatably mounted on a blade holder of the knife and driven about a central rotational axis of the blade by the power source;
   (c) a vertically extending handle on the trimming knife adapted to be grasped by a user of the knife for moving the blade across a piece of meat being trimmed, with a longitudinal axis of the handle extending generally parallel to the rotational axis of the cutting blade; and
   (d) driving means extending through the handle and connected to the power source by the power supply line for rotatably driving the cutting blade.

14. The system defined in claim 13 including power control means for starting and stopping the flow of power from the power source to the knife.

15. The system defined in claim 14 wherein the power control means includes a switch operatively connecting the power supply line to the power control means whereby downward movement of the knife and power supply line actuates the switch and connects the power source to the knife and whereupon upward movement of the knife and power supply line actuates the switch and disconnects the power source from the knife.

16. The system defined in claim 15 in which the power source is an electric drive motor and the power supply line is a flexible drive cable operatively connected to the motor.

17. The system defined in claim 16 in which the electric drive motor is connected to the drive cable by a pair of pulleys and a connecting drive belt.

18. The system defined in claim 17 in which the drive pulleys and belt are located within a housing extending generally horizontally outwardly from the electric drive motor above the work station; and in which the housing is rotatably mounted with respect to the motor.

19. The system defined in claim 18 in which the housing is pivotally mounted on the electric motor; and in which pivotal movement of the housing by vertical movement of the knife and supply line automatically actuates the switch for energizing and deenergizing the electric drive motor.

20. The system defined in claim 19 in which spring means is connected to the housing for biasing said housing to a raised position where the switch deenergizes the electric motor.

21. The system defined in claim 15 in which the power source is a supply of pressurized fluid and the power supply line is a conduit for delivering the fluid to the driving means; in which said driving means is a fluid motor mounted in the elongated handle; and in which the fluid motor is connected to the cutting blade through a plurality of meshing gears.

22. The system defined in claim 13 in which a first gear is mounted in the knife and drivingly engages the cutting blade for rotating said blade; in which a second gear is mounted in the knife and drivingly engages the first gear for rotating said first gear; and in which the driving means is connected to the second gear for rotating said second gear.

* * * * *